Aug. 16, 1960
H. J. LAWRENCE
2,949,123
FLUID FLOW DETERMINING APPARATUS
Filed Nov. 2, 1955
4 Sheets-Sheet 1
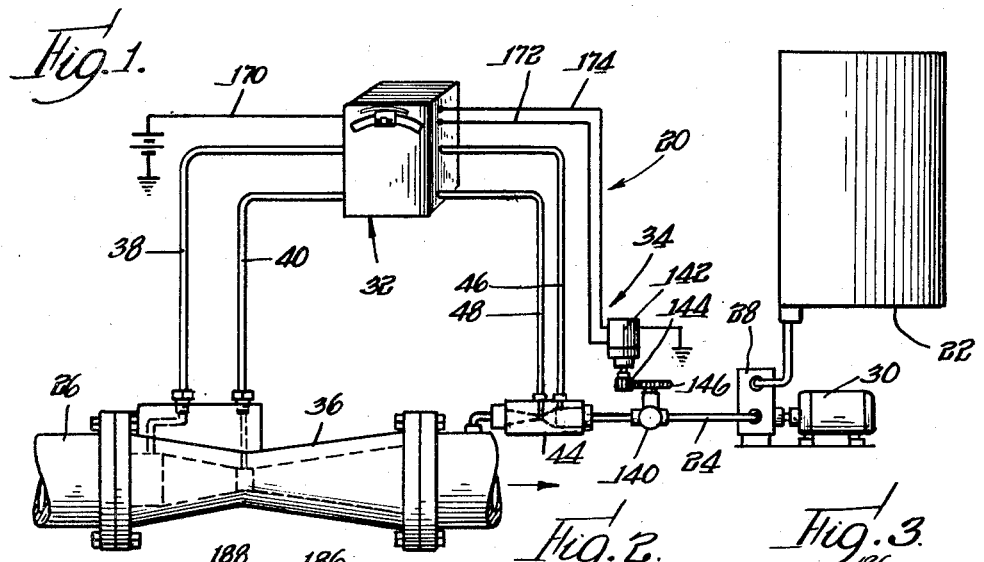
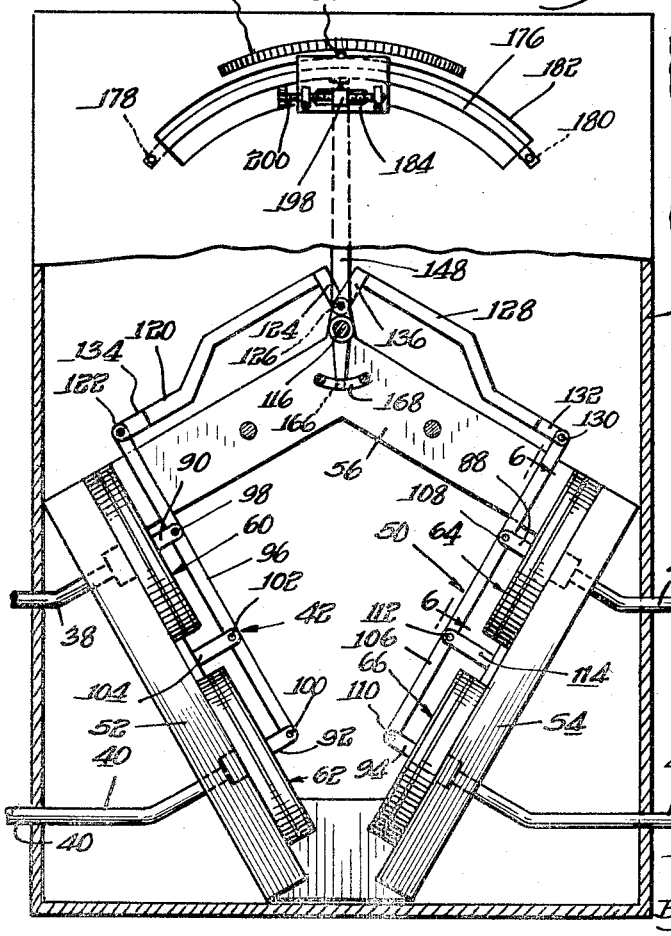
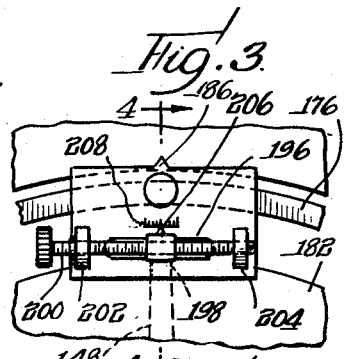
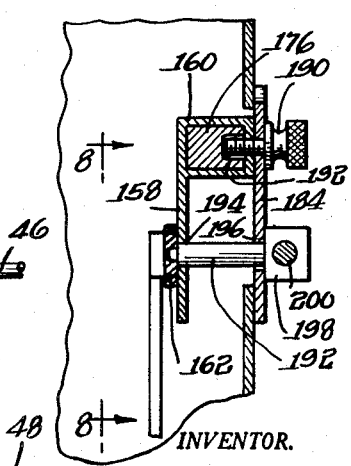
INVENTOR.
Harry J. Lawrence
By: Olson & Trexler
attys.

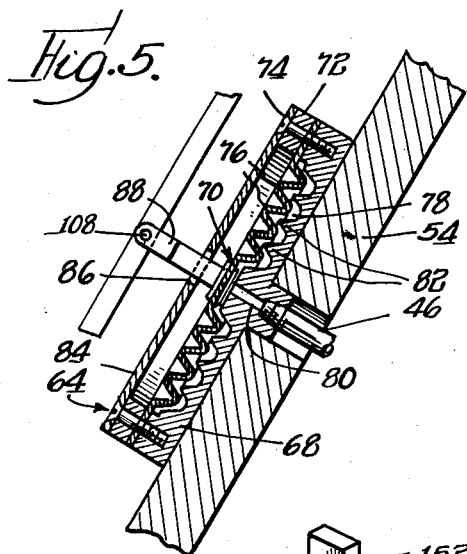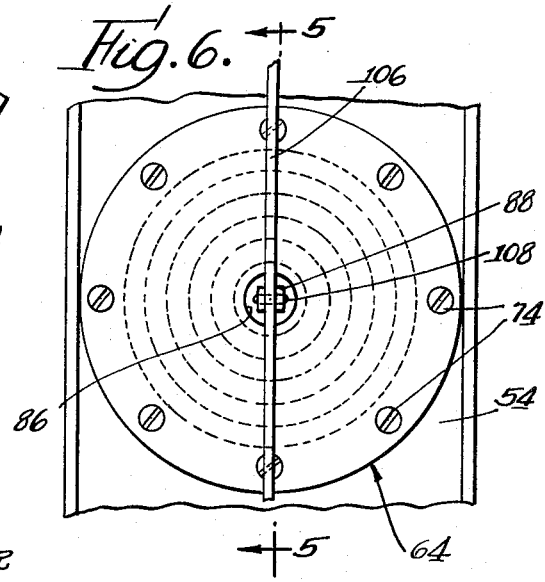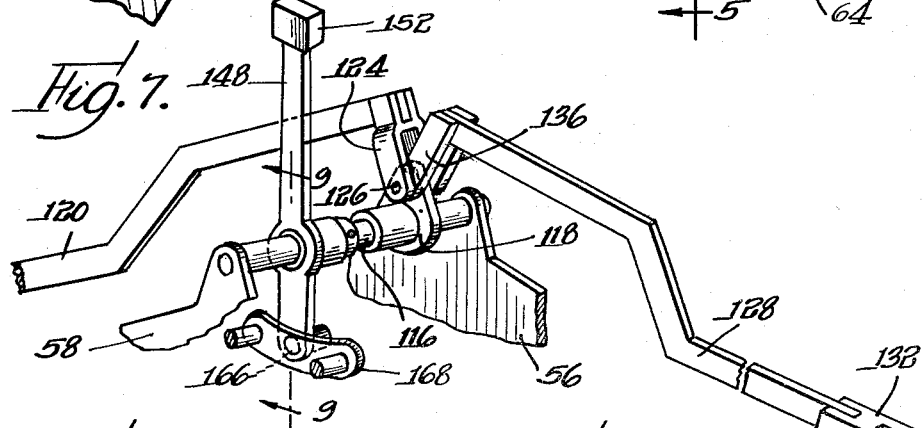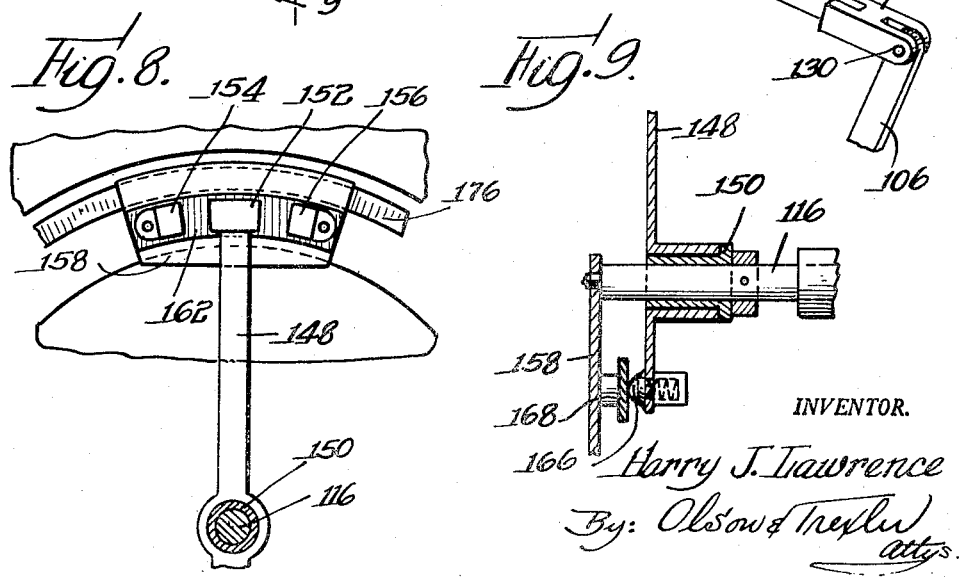

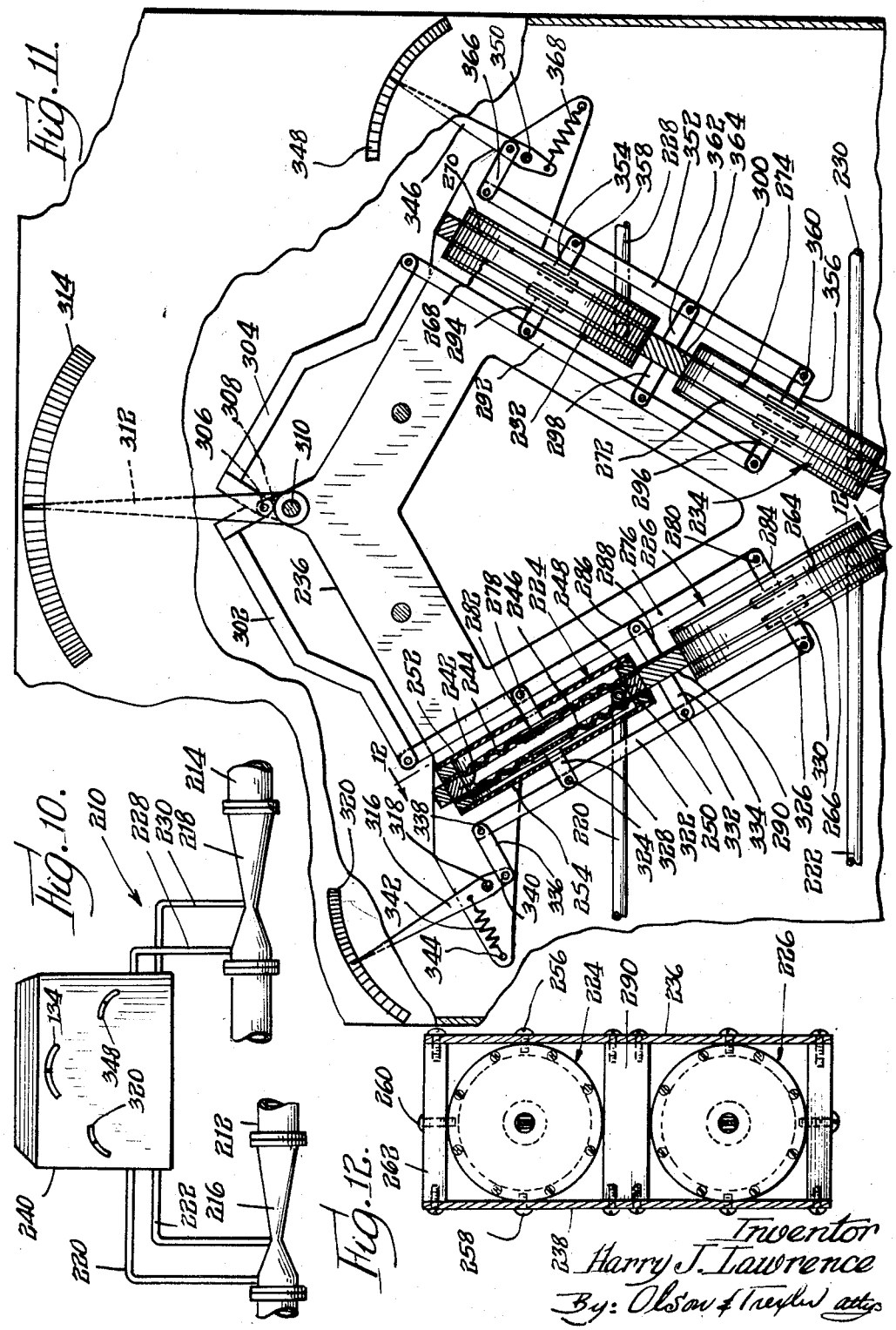

Aug. 16, 1960

H. J. LAWRENCE 2,949,123

FLUID FLOW DETERMINING APPARATUS

Filed Nov. 2, 1955

INVENTOR.

Harry J. Lawrence

By: Olson & Trexler
Attys.

United States Patent Office 2,949,123
Patented Aug. 16, 1960

2,949,123
FLUID FLOW DETERMINING APPARATUS

Harry J. Lawrence, Milwaukee, Wis., assignor to Perc C. Sorenson and Lee Jewell, Wauwatosa, Wis.

Filed Nov. 2, 1955, Ser. No. 544,556

6 Claims. (Cl. 137—88)

The present invention relates to a novel apparatus for determining the ratio between the rates of fluid flow through a plurality of conduits.

It is frequently desirable in many chemical processes or fluid mixing processes to know the ratio between the rate of fluid flow through one conduit to the rate of fluid flow through another conduit. For example, if two fluids are to be mixed together, it is desirable to know the ratio of the rates of flow of the two liquids through their respective supply conduits so that the ratio of the liquids in the resulting mixture may be controlled. It is, therefore, an important object of the present invention to provide a novel apparatus for determining the ratio between the rates of fluid flow through a plurality of conduits, which apparatus is capable of providing an accurate determination of the fluid flow ratio and is of relatively simple construction so as to facilitate the economical manufacturing thereof.

It is frequently desirable to know the direct or absolute rates of fluid flow through a plurality of conduits as well as the ratio between the rate of fluid flow, and it is, therefore, another object of the present invention to provide a novel apparatus capable of determining both the ratio between the rates of fluid flow through a plurality of conduits and the absolute rates of fluid flow through the conduits.

A more specific object of the present invention is to provide a novel apparatus of the type mentioned in the preceding paragraph wherein portions of the ratio determining mechanism and portions of the rate determining mechanism are combined so as to simplify the apparatus and facilitate manufacturing and installation thereof.

Another object of the present invention is to provide a novel apparatus of the above described type which is capable of continuously and accurately maintaining the ratio of the rates of fluid flow through a pair of conduits within predetermined limits.

Still another object of the present invention is to provide a novel fluid flow ratio determining apparatus wherein an easily readable continuous indication of the flow ratio is obtained.

A further object of the present invention is the provision of a novel fluid flow ratio determining apparatus of the above described type which is capable of providing a continuous and permanent record of the ratio between fluid flow rates through a plurality of conduits.

Other objects and advantages of the present invention will become apparent from the following description and the accompanying drawings wherein:

Fig. 1 shows an apparatus embodying the novel features of the present invention, which apparatus is adapted to maintain the ratio between the rates of fluid flow through a pair of conduits within predetermined limits;

Fig. 2 is an enlarged elevational view partially broken away showing a portion of the apparatus in greater detail;

Fig. 3 is a further enlarged fragmentary elevational view showing a portion of the apparatus which is adjustable to vary the controlled ratio of the fluid flow rates;

Fig. 4 is an enlarged fragmentary sectional view taken along line 4—4 in Fig. 3;

Fig. 5 is a fragmentary sectional view taken along line 5—5 in Fig. 6;

Fig. 6 is a fragmentary view taken along line 6—6 in Fig. 2;

Fig. 7 is an enlarged perspective view showing a linkage mechanism incorporated in the apparatus;

Fig. 8 is a fragmentary view taken along line 8—8 in Fig. 4;

Fig. 9 is a fragmentary sectional view taken along line 9—9 in Fig. 7;

Fig. 10 shows an embodiment of the present invention which is capable of not only providing a determination of the ratio between the rates of fluid flow through a pair of conduits but which is also capable of independently determining the rate of fluid flow through the conduits;

Fig. 11 is an enlarged fragmentary elevational view partially broken away showing the ratio determining mechanism and the flow rate determining mechanism of the apparatus shown in Fig. 10 in greater detail;

Fig. 12 is a fragmentary sectional view taken along line 12—12 in Fig. 11;

Figure 13:
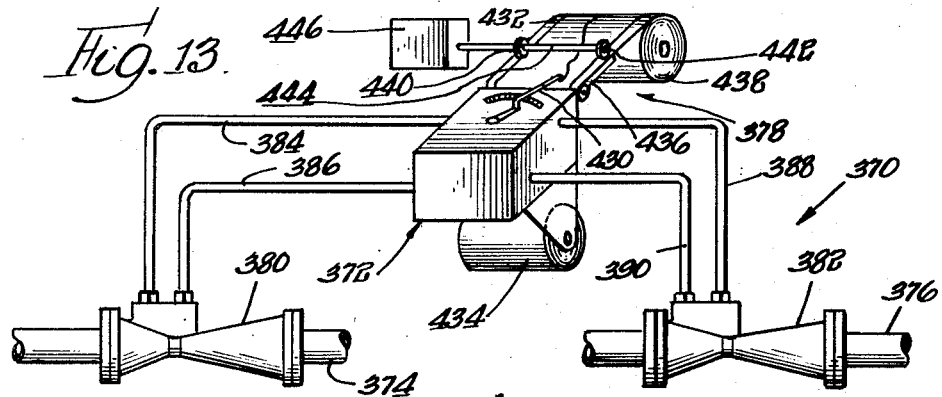
Fig. 13 shows an apparatus embodying a slightly modified form of the present invention.

Referring now more specifically to the drawings wherein like parts are designated by the same numerals throughout the various figures, an apparatus 20 embodying one form of the present invention is shown in Figs. 1 through 9. This apparatus is especially adapted to control the ratio of fluid flow rates in a pair of conduits, and may be used, for example, in a system wherein one fluid is to be directed from a supply tank 22 through a conduit 24 and mixed with another fluid flowing through a conduit 26. The fluid is delivered from the tank to the conduit 24 by a suitable pump 28 driven by a motor 30 or in any other desired manner, and a pump, not shown, or any other suitable means is provided for delivering a second fluid through the conduit 26. As will be understood, the rates of fluid flow through these conduits may from time to time vary for one reason or another so that the ratio between the fluid flow rates tends to change. However, with the apparatus 20 of the present invention, this ratio can be constantly maintained substantially within predetermined limits.

The apparatus 20 includes means 32 for determining the ratio of the fluid flow rates, and means 34 actuated by said ratio determining means for controlling the fluid flow rate through the conduit 24. The ratio determining means comprises a Venturi 36 connected in the conduit 26, a pair of fluid lines 38 and 40, respectively, having ends thereof connected with the upstream end of the Venturi and the throat of the Venturi and opposite ends connected with means 42 which is adapted to create a force in accordance with the pressure differential between the fluid pressures in the lines 38 and 40. Similarly, a Venturi 44 is connected in the conduit 24, and fluid lines 46 and 48, respectively, have ends thereof connected with an upstream end of the Venturi 44 and the throat of the Venturi 44, and opposite ends connected with force creating means 50. The force creating devices are respectively secured to mounting blocks 52 and 54 which are supported between similar frame members 56 and 58 and which are enclosed by a housing 59. As will be understood, the housing may be suitably mounted in any convenient location. It will also be understood that orifices or other suitable means may be substituted for the Venturis for providing different pressures in spaced areas of the conduits.

The force creating device 42 includes a flexible diaphragm assembly 60 connected to the fluid line 38 and a second flexible diaphragm assembly 62 connected to the fluid line 40, and the force creating device 50 includes a pair of flexible diaphragm assemblies 64 and 66, respectively, connected with the fluid lines 46 and 48. Since all of the diaphragm assemblies are essentially identical, only the assembly 64, which is shown in Figs. 2, 5 and 6, will be described in detail.

The assembly 64 comprises a body member 68 secured to the mounting block 54, and a flexible diaphragm 70 clamped in sealing relationship to a peripheral face portion of the body member by a clamping ring 72 and a plurality of screws 74. The diaphragm is provided with a plurality of annular corrugations 76, which corrugations serve to make the diaphragm more nearly perfectly flexible and substantially eliminate the spring effect of the diaphragam when the diaphragm is flexed by fluid pressure in the manner described below. The face of the body member 68 is relieved to provide a fluid chamber 78 which communicates with the fluid line 46 through a passageway 80. The body member is provided with annular ribs 82 which project between the corrugations in the diaphragm to decease the volume of the fluid chamber and thereby reduce any errors which might arise as a result of thermal expansion or contraction of the fluid. A cover plate 84 is secured to the top of the clamping ring to protect the diaphragm and the space between the cover plate and the diaphragm is vented to the atmosphere by an aperture 86 so that the diaphragm may flex in accordance with the fluid pressure in the chamber 78.

An arm 88 having a bifurcated outer end portion is secured in any desired manner to the mid-portion of the diaphragm 70 and extends outwardly through the aperture 86 in the cover plate. Similar arms 90, 92 and 94 are carried by the diaphragms of the assemblies 60, 62 and 66 as shown in Fig. 2. A lever 96 is pivotally connected to the outer ends of the arms 90 and 92 by pins 98 and 100, respectively. In addition, the lever 96 is pivotally connected by a pin 102 to the outer end of a bracket 104 fixed to the mounting block 52 so that upon relative flexing of the diaphragms in the assemblies 60 and 62, the lever 96 will pivot about the pin 102. A similar lever 106 is connected to the outer ends of the arms 88 and 94 by pins 108 and 110, respectively, and is also pivotally connected by a pin 112 to a bracket 114 secured to the mounting block 54. It will be appreciated that with the fluid lines 38 and 40 connected to the Venturi 36 in the manner shown and described, different fluid pressures which vary in accordance with the square of the rate of fluid flow through the conduit 26 will be created in the lines 38 and 40 and exerted against the diaphragms of the assemblies 60 and 62, respectively. These pressures tend to flex the diaphragms outwardly with forces which are transmitted to the lever 96 through the arms 90 and 92. Since the pins 98 and 100 are disposed at opposite sides of and are equally spaced from the pivot pin 102, the lever 96 will tend to pivot in a clockwise direction as viewed in Fig. 2 with a force provided by the differential between the pressures in the lines 38 and 40. Similarly, the lever 106 of the force creating device 50 will tend to pivot in a counterclockwise direction as viewed in Fig. 2 with a force determined by the differential between the fluid pressures in the lines 46 and 48 which are connected to the Venturi in the conduit 24.

Means is provided for combining the forces transmitted by the levers 96 and 106 so as to provide a determination of the ratio between the rates of fluid flow through the conduits 24 and 26. For a detailed disclosure as to the mode of operation of force combining means of the general type contemplated herein, reference is made to the United States Patent No. 2,268,549 issued to Roy J. Kennedy. As shown in Figs. 2 and 7, the force combining means contemplated herein includes a shaft 116 rotatably supported between the frame members 56 and 58 and carrying an arm or crank 118 which is secured against relative rotation with respect to the shaft. A link 120 has one end pivotally connected to the lever 96 by a pin 122 and an opposite end rigidly connected to a bifurcated member 124 which is pivotally connected to the arm 118 by a pin 126. A similar link 128 has one end connected to the lever 106 by a pin 130. Preferably, a bifurcated member 132 which is rigidly secured to the link 128 is provided for connecting the link to the lever 106 as shown in Fig. 7. As will be understood, a similar connecting member 134 may be provided between the link 120 and the lever 96. The opposite end of the link 128 also has a bifurcated member 136 rigidly fixed thereto which is also pivotally connected to the arm 118 by the pin 126. Thus, the forces created in response to the flow of fluids through the conduits 24 and 26 are applied in generally opposing relationship to the shaft 116 through the arm 118. Thus, the shaft 116 will be rotated until the torque applied thereto through the link 120 and the arm 118 is equal to and balances the torque applied thereto through the link 128 and the arm 118. When the various arms, levers and links are in the positions shown in Fig. 2, the angle between a line extending through the pins 122 and 126 and a vertical line extending through the centers of the shaft 116 and pin 126 is equal to the angle between a line extending through the pins 126 and 130 and said vertical line so that the effective lever arm provided by the arm 118 is the same for both links 120 and 128. Thus, in order to have the parts balanced in the position shown the forces applied by the links 120 and 128 must be equal. In the event one of the forces applied by either the link 120 or the link 128 either increases or decreases as a result of a change in the fluid flow rate, the system becomes unbalanced and the shaft 116 will be rotated. As the shaft rotates the effective lever or crank arms provided by the member 118 for the links 120 and 128 change relative to each other until the system is again brought into balance. This action is described more in detail below.

The means 34 for controlling the rates of fluid flow through the conduit 24 includes a valve 140 connected in the conduit 24 and a reversible electric motor 142 for opening and closing the valve. The valve stem is actuated by means of a pinion 144 fixed to the motor shaft which meshes with a gear 146 fixed to the stem. The means 34 also includes switch means for selectively energizing the motor 142 to operate in opposite directions in accordance with the determination of the fluid flow ratio provided by the means 32.

As best shown in Figs. 2, 3, 4, 7, 8 and 9, the above mentioned switch means includes a pointer or movable contact member 148 fixed on a bushing 150 of insulating material, which bushing is, in turn, fixed to the shaft 116. One end of the member 148 carries a contact block 152 disposed between and selectively engageable with contacts 154 and 156. The contacts 154 and 156 are fixed on a depending flange 158 of a slide 160 and are separated from the flange by block 162 of insulating material. The opposite end of the pointer member 148 carries a spring-biased contact ball 166 which bears against a contact plate 168 mounted on and insulated from the frame member 58. The contact plate 168 is connected with a source of electrical energy by a wire 170. The fixed contacts 154 and 156 are connected with the motor 142 by wires 172 and 174 so that when the contact 152 engages the contact 154, the motor is energized and rotated in one direction and when the contact 152 engages the contact 156, the motor is energized and rotated in the opposite direction. With this arrangement the ratio between the rates of fluid flow through the conduits 24 and 26 is maintained within predetermined limits set by the spacing of the contacts 154 and 156. For example, if the flow rate through the conduit 24 increases relative to the flow rate to the conduit 26, the shaft 116 of the ratio determining mechanism will rotate in a counterclockwise direction as viewed in Fig. 2, and in a clockwise direction as viewed in Fig. 8 until the contact 152 engages the contact 156 for energizing the motor 142 to partially close the valve 140 and reduce the rate of fluid flow through the conduit 24 until the desired flow ratio is again established. As will be understood, the mechanisms will function to partially open the valve 140 in the event the rate of fluid flow through the conduit 24 decreases more than a predetermined amount relative to the rate of fluid flow through the conduit 26.

The fixed contact members 154 and 156 are preferably adjustably mounted so that the apparatus may selectively maintain various flow ratios. More specifically, the above mentioned slide member 160 is adjustably disposed on an arcuate track member 176 having its opposite ends secured to the housing as at 178 and 180. The track member traverses an arcuate opening 182 in the front of the housing. A depending plate member 184 is connected to the slide for movement therewith, which plate member overlies the front of the housing and is provided with a pointer 186 cooperable with a scale 188 formed on the housing to indicate the position to which the slide and the fixed contacts are adjusted, and more particularly, to indicate the flow ratio which will be maintained by the apparatus. A set screw 190 extends through the slide and into an elongated arcuate slot 191 in the track member for locking the slide in the desired adjusted position. In order to obtain a further and more accurate adjustment of the position of the contacts 154 and 156, the insulating block 162 to which the contacts are secured is connected with a bar 192 which extends through elongated slots 194 and 196 in the depending plates 158 and 184, respectively. The outer end of the bar is rigidly connected with a nut member 198 threaded onto an adjusting screw 200. The screw 200 is rotatably supported by a pair of lugs 202 and 204 fixed to the plate member 184 and having unthreaded apertures receiving the screws. Thus, the contacts may be adjusted by rotating the screw 200, as will be understood, and a pointer 206 is provided on the nut member 198 for cooperation with a scale 208 on the plate 184 to indicate the position to which the contacts are adjusted.

In Figs. 10, 11 and 12 there is shown an apparatus 210 which not only provides a determination and indication of the ratio between the rates of fluid flow through conduits 212 and 214, but also provides indications of the absolute fluid flow rates through the conduits. The apparatus 210 includes Venturis 216 and 218 connected in the conduits 212 and 214, respectively. Fluid pressure lines 220 and 222 have ends thereof connected with the Venturi 216 in the manner shown in Fig. 10 and opposite ends thereof connected with pressure responsive devices 224 and 226. Similar fluid pressure lines 228 and 230 are connected with the Venturi 218 and with fluid pressure responsive devices 232 and 234. The pressure responsive devices are mounted between frame members 236 and 238 and are enclosed within a housing 240. As shown in Fig. 11, the pressure responsive device 224 includes an annular body 242 having flexible diaphragms 244 and 246 clamped against sides thereof by clamping rings 248 and 250, respectively. Preferably, cover plates 252 and 254 are secured to the clamping rings to protect the diaphragms. The pressure responsive device 224 is secured in position (Fig. 12) by screw members 256 and 258 which extend through the frame members and partially into the annular body as shown in Fig. 12. In addition, a screw member 260 is inserted through a spacing bar 262 disposed between the frame members and threaded partially into the annular body 242. The remaining pressure responsive devices are constructed and mounted in substantially the same manner as the device 224. It suffices to state that the device 226 includes flexible diaphragms 264 and 266, the device 232 includes diaphragms 268 and 270, and the device 234 includes diaphragms 272 and 274. A lever 276 is connected by pivot pins 278 and 280 to bifurcated arms 282 and 284, respectively, secured to the diaphragms 244 and 264. In addition, the lever is connected by a pivot pin 286 to a fixed bifurcated member 288 secured to a spacing block 290. A similar lever 292 is pivotally connected to arms 294 and 296 attached to the diaphragms 268 and 272. This lever is also pivotally connected to a fixed member 298 extending from a spacing block 300. Upper ends of the levers 276 and 298 are respectively pivotally connected to links 302 and 304 which, in turn, are connected by a pivot pin 306 to a lever arm 308 fixed on a rotatable shaft 310. As will be understood, this mechanism serves to shift the rotatable shaft 310 in accordance with the ratio between the rates of fluid flow through the conduits 214 and 216. In this embodiment, a pointer 312 is mounted on the shaft 310 and cooperates with a scale 314 on the housing to provide an indication of the fluid flow ratio. If desired, however, the pointer and scale may be replaced by the above described control means including the reversing switch means, electric motor, valve and related elements for varying the rate of fluid flow through one of the conduits. Alternatively, such control means may be provided in addition to the pointer and scale.

In order to provide an indication of the absolute rate of fluid flow through the conduit 212, the apparatus 210 is provided with a pointer 316 pivotally mounted on a shaft 318 and cooperable with a scale 320 on the housing. The pointer is actuated in accordance with the differential between the pressures in the lines 220 and 222 and the scale 320 is calibrated in accordance with the internal diameter of the conduit 212 so that the pointer will indicate the true flow rate. In order to actuate the pointer 316, a lever 322 is connected by pins 324 and 326 to bifurcated arms 328 and 330 which are respectively secured to the diaphragms 246 and 266. In addition, the lever 322 is pivotally connected by means of a pin 332 to a fixed member 334 secured to the spacing block 290. Thus, the lever 322 is actuated in response to relative flexing of the diaphragms 246 and 266, and movement of the lever 322 is transmitted to the pointer 316 through a link 336 pivotally connected to the lever by a pin 338 and to the pointer by a pin 340. A spring 342 is connected to a pin 344 secured to the frame and to the pointer for yieldably biasing the pointer toward the zero position. Similar means is provided for indicating the true rate of fluid flow through the conduit 214. More specifically, a pointer 346 cooperable with a scale 348 is pivotally mounted by a pin 350. The pointer 346 is actuated by a lever 352 connected with the diaphragms 270 and 274 by arms 354 and 356 and pins 358 and 360, respectively, and to a fixed pivot member 362 by a pin 364. The lever is interconnected with the pointer 346 by a link 366 and a spring 368 is provided for biasing the pointer 346 toward the zero position. The springs 342 and 368 are preferably of the type having a substantially constant spring rate.

Figure 14:
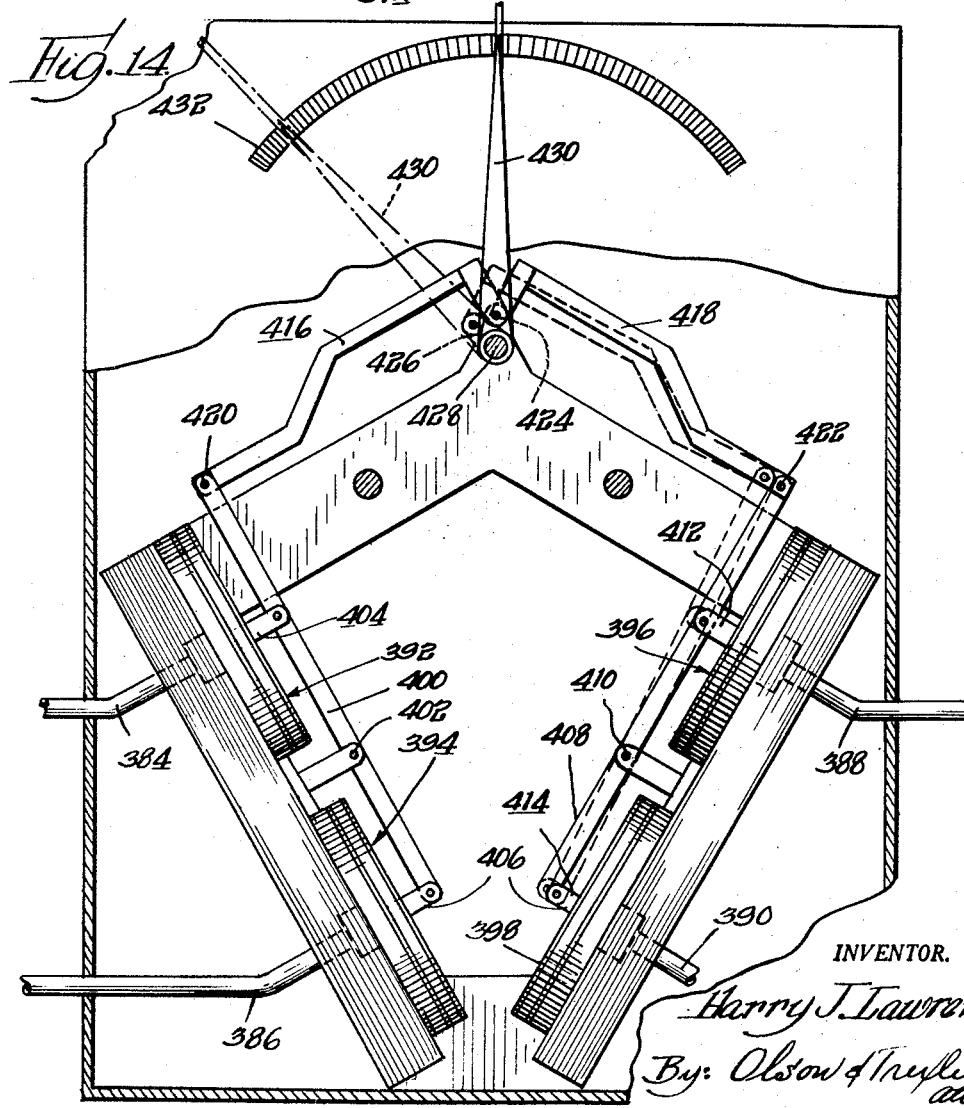
Fig. 14 is an enlarged view partially broken away and showing a force combining and indicating mechanism of the apparatus of Fig. 13 in greater detail.

Figs. 13 and 14 show an apparatus 370 which embodies another modified form of the present invention. This apparatus includes means 372 for determining the ratio between the rates of fluid flow through conduits 374 and 376, and means 378 for recording the result obtained by the ratio determining mechanism.

The ratio determining mechanism 372 is similar to the corresponding structure disclosed in Figs. 1 through 7 and need not be described in detail. However, it may be stated that this mechanism includes Venturis 380 and 382, respectively, connected in the conduits 374 and 376 and respectively connected with fluid pressure lines 384—386 and 388—390. The fluid pressure lines are respectively connected with flexible diaphragm assemblies 392, 394, 396 and 398. A lever 400 is connected with a fixed pivot pin 402 and also with the diaphragms of the assemblies 392 and 394 through arms 404 and 406, and a similar lever 408 is connected with a fixed pivot 410 and with the diaphragms of the assemblies 396 and 398 by arms 412 and 414. Links 416 and 418 are respectively connected with upper ends of the levers 400 and 408 by pins 420 and 422. Opposite ends of the links are connected by a common pin 424 to an arm 426 fixed on a rotatable shaft 428.

In this embodiment, a pointer 430 is fixed on the shaft 420 for cooperating with a scale 432 to provide an indication of the fluid flow ratio. This pointer which is preferably in the form of a marking or an inking pin, of known construction, also forms a part of the recording mechanism 378. As shown in Fig. 13, the pointer and marking instrument 430 extends beyond the scale for cooperation with a sheet or strip 432 of graph paper. The strip of graph paper is directed from a supply roll 434 over a table 436 to a take-up roll 438. Friction rollers 440 and 442 are fixed on a shaft 444 for feeding the strip of graph paper. The shaft 444 is driven by a clock motor device 446 of known construction.

The manner in which the ratio determining mechanism functions is shown in Fig. 14. More particularly, in the embodiment illustrated, the levers and links are constructed so that when the differential between the pressures in the diaphragm assemblies 392 and 394 is equal to the differential between the pressures in the assemblies 396 and 398, the system balances with the levers and links in the positions shown by the solid lines. With the elements in their solid line position, any relative increase in the rate of fluid flow through the conduit 376 will provide a relative increase in the differential between the pressures in the diaphragm assemblies 396 and 398 so that the force exerted by the lever 408 on the link 418 is greater than the force exerted by the lever 400 on the link 416. This causes the levers and links and pointer to shift toward the dotted line position. As the lever 426 rotates toward the dotted line position, a line extending through the pivot pins 422 and 424 approaches the center of the rotatable shaft 428; or in other words, the effective lever arm provided by the member 426 for the link 418 rapidly decreases. At the same time, the effective length of the lever arm provided by the member 426 for the link 416 varies only slightly during the movement of the member 426 from the solid line position to the dotted line position. As a result, the system will again become balanced when the effective lever arm provided for the link 418 has decreased with respect to the effective lever arm provided for the link 416 sufficiently so that the products of the forces applied to the effective lever arms are equal. As will be understood, the mechanism will function in a similar manner when the shaft 428 is rotated in a clockwise direction as a result of a relative increase in the differential between the pressures in the diaphragm assemblies 392 and 394. Since the effective lever arm provided by the member 426 for the link 416 varies only slightly when the shaft is rotated in a counterclockwise direction and the effective lever arm for the link 418 varies only slightly when the shaft is rotated in a clockwise direction, movement of the pointer 430 along a substantial mid-portion of the scale 432 will be approximately directly proportional to any change in the ratio between the rates of fluid flow through the conduits. As a result, the mid-portion of the scale 432 is approximately lineally calibrated as shown, and this facilitates accurate and easy reading of the fluid flow ratio indicated by the apparatus.

While the preferred embodiments of the present invention have been shown and described herein, it is obvious that many structural details may be changed without departing from the spirit and scope of the appended claims.

The invention is claimed as follows:

1. In an apparatus of the type described, the combination comprising support means, a first pair of adjacently disposed pressure responsive devices connectable with spaced areas of a Venturi or the like in a fluid conduit and each including a flexible diaphragm, a lever operatively connected to said diaphragms and mounted for movement about a fixed pivot disposed between said diaphragms so that the diaphragms act upon the lever in opposition to each other, a second pair of adjacently disposed pressure responsive devices connectable with spaced areas of a second Venturi or the like in a second fluid conduit and each including a flexible diaphragm, a second lever operatively connected with said second mentioned diaphragms and mounted for movement about a fixed pivot disposed between said second mentioned pressure responsive devices so that said second mentioned diaphragms act upon the second lever in opposition to each other, means mounted on said support means for rotation about a predetermined axis, means for transmitting a force provided by said first lever to said rotatable means at a point radially spaced from said axis, and means for transmitting a force provided by said second lever to said rotatable means at a point spaced radially from said axis and in opposing relationship with respect to said first mentioned force to position said rotatable means in accordance with the ratio between the rates of fluid flow through said conduits.

2. An apparatus, as defined in claim 1, which includes means actuated in response to movement of said rotatably mounted member for relatively varying the rates of fluid flow through said conduits to maintain the fluid flow ratio within predetermined limits.

3. An apparatus, as defined in claim 1, which includes means actuated in response to movement of said rotatably mounted member for recording the fluid flow ratio.

4. An apparatus, as defined in claim 1, which includes means actuated in response to movement of said rotatably mounted member for providing an indication of the fluid flow ratio.

5. An apparatus, as defined in claim 1, which includes means in addition to said first mentioned lever connected with said first pair of adjacently disposed pressure responsive devices for providing a force in addition to the force provided by said first lever, and means responsive to said last mentioned force and providing a determination of the rate of fluid flow through said first conduit.

6. An apparatus, as defined in claim 5, which includes additional means connected with said second pair of adjacently disposed pressure devices for providing a force in addition to the force provided by said second lever, and means responsive to said last mentioned force for providing a determination of the rate of fluid flow through said second conduit.

References Cited in the file of this patent

UNITED STATES PATENTS

| | | |
|---|---|---|
| 1,435,846 | Hogg | Nov. 14, 1922 |
| 1,898,020 | Roe | Feb. 21, 1933 |
| 1,901,032 | Kallam | Mar. 14, 1933 |
| 2,074,882 | Wunsch | Mar. 23, 1937 |
| 2,193,095 | Harrison | Mar. 12, 1940 |
| 2,538,824 | Andresen | Jan. 23, 1951 |
| 2,587,701 | Davis | Mar. 4, 1952 |

FOREIGN PATENTS

| | | |
|---|---|---|
| 315,751 | Great Britain | July 17, 1929 |